United States Patent [19]

Schmeichel et al.

[11] Patent Number: 4,505,512
[45] Date of Patent: Mar. 19, 1985

[54] ROLL-UP TARP APPARATUS

[76] Inventors: Steven C. Schmeichel; Charles M. Schmeichel, both of Hwy. 20, Jamestown, N. Dak. 58401

[21] Appl. No.: 447,291

[22] Filed: Dec. 6, 1982

[51] Int. Cl.³ .............................................. B60P 7/02
[52] U.S. Cl. ........................................ 296/98; 135/89; 160/238; 160/309
[58] Field of Search ................ 296/98, 100; 135/5 A, 135/5 AT, 89; 160/238, 309

[56] References Cited

U.S. PATENT DOCUMENTS

| | | | |
|---|---|---|---|
| 1,322,326 | 11/1919 | Miller | 296/100 |
| 2,743,132 | 4/1956 | Zahn | 296/100 |
| 3,384,413 | 5/1968 | Sargent | 296/98 |
| 3,467,431 | 9/1969 | Turcotte | 296/98 |
| 3,494,658 | 2/1970 | Maes | 296/100 |
| 3,667,802 | 6/1972 | Love | 296/98 |
| 3,785,694 | 1/1974 | Sargent | 296/98 |
| 3,942,830 | 3/1976 | Woodard | 296/105 |
| 4,014,590 | 3/1977 | Schulz | 296/100 |
| 4,030,780 | 6/1977 | Petretti | 296/100 |
| 4,212,492 | 7/1980 | Johnsen | 296/98 |
| 4,302,043 | 11/1981 | Dimmer et al. | 296/98 |

OTHER PUBLICATIONS

Brochure entitled Eqy-Roll Tarp System by Lode-King Ltd.
Brochure entitled Sidewinder by Koffler's and Michael's.
Brochure entitled Snaplock by Aero Industries, Inc.
Brochure entitled Roll-Tight by Frontier Inc.

Primary Examiner—Richard A. Bertsch
Attorney, Agent, or Firm—Merchant, Gould, Smith, Edell, Welter & Schmidt

[57] ABSTRACT

A roll-up tarp assembly (10) for an open truck box or trailer (12). The roll-up tarp assembly (10) includes a tarp (14) made from a flexible material. The tarp (14) is securedly attached along one side to the top of the truck box (12). The other side of the tarp is attached to a roll bar (64) by a plurality of flexible straps (60). A crank apparatus (26) connected to the roll bar (64) by a U-joint (74) and collar (80) assembly is utilized to roll the tubular member transversely of the truck box opening so as to enclose the truck box (12) with the tarp (14) or uncover the truck box (12). A plurality of hooks (40) are attached to the side of the truck box (12) opposite of the side to which the tarp (14) is fixedly secured. The hooks (40) retain the roll bar (64) when the tarp (14) is covering the truck box (12).

14 Claims, 8 Drawing Figures

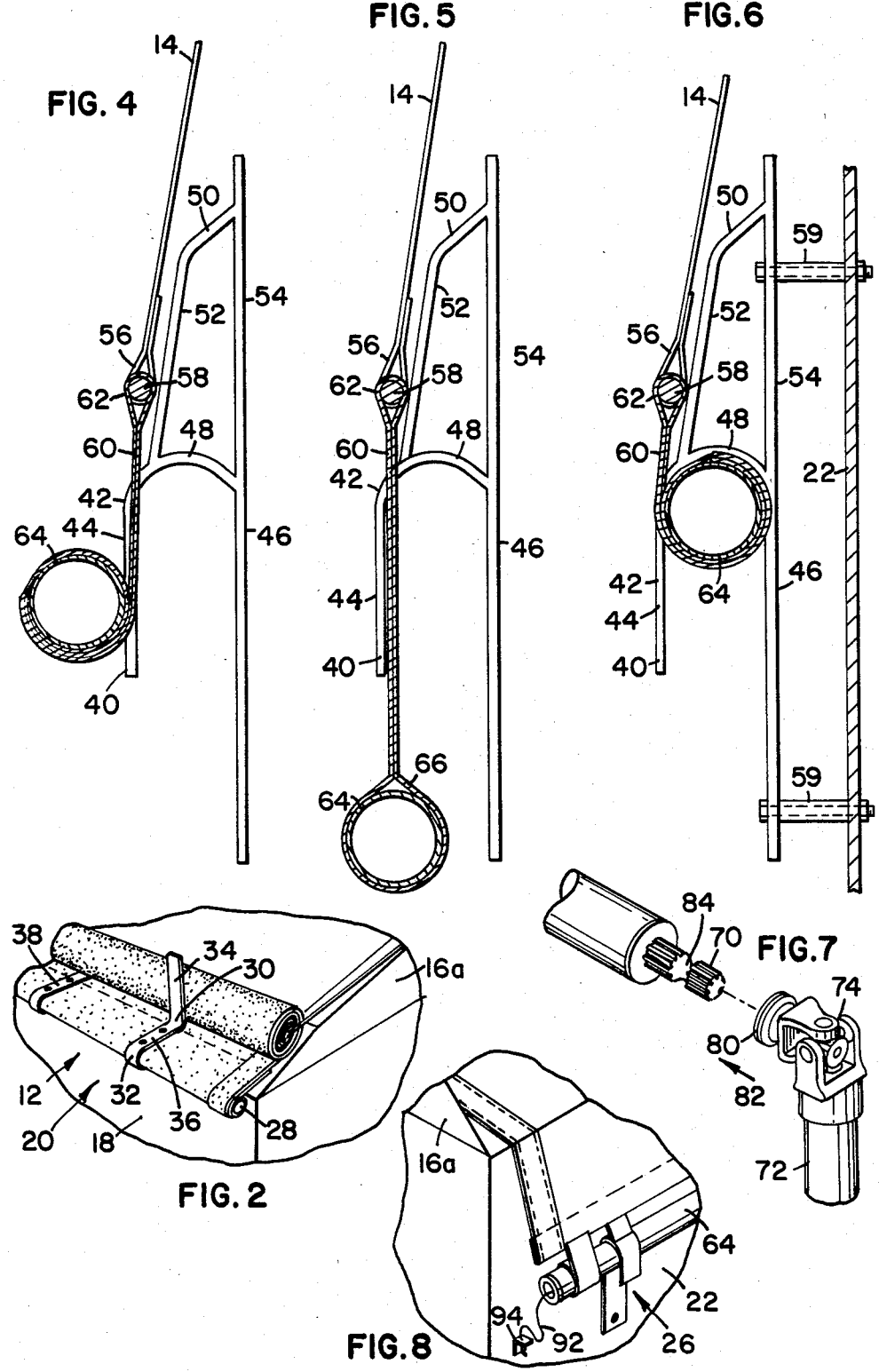

ROLL-UP TARP APPARATUS

BACKGROUND OF THE INVENTION

This invention relates to a removable cover assembly for open containers or the like. More particularly, the present invention relates to a roll-up tarp apparatus for an open truck box or trailer.

Roll-up tarp apparatus for truck and trailer bodies having an open top are widely utilized in the trucking industry. For example, U.S. Pat. No. 4,302,043 discloses a roll-up tarp for trailers having a tarp secured to one longitudinal top edge of the truck box or trailer while the opposite edge of the tarp is affixed to a tube which extends the length of the trailer. The rear of the tube is attached to a universal joint which in turn is attached to a crank handle such that the tube can be rolled transversely across the top of the truck box. When the tarp is unrolled, the tube rolls over a latch plate attached along the longitudinal top edge of the truck box on the opposite side of the vehicle from where the tarp is secured. The tube is then wound in an opposite direction such that the tarp is wedged between the latch plate and the truck.

This method of securing the tarp in a covered position has several problems associated with it, some of which are discussed below. Firstly, there is a problem with tarp wear as the tarp is constantly rubbing against the latch plate and the truck box when in the covered position. Additionally, during the wedging process, the fabric has a tendency to pinch and bunch up between the tube and the plate so as to create a force opposing the tightening of the tarp. This makes it difficult to fully tighten the tarp and frequently results in a tarp which is not very tight. Furthermore, the tarp has a tendency to loosen during transit. This is especially true if an excessive amount of cargo is loaded into the truck box so as to be heaped above the height of the framework which supports the tarp. During transit, the load will settle resulting in a loose tarp which may accidentally release causing a road hazard. The binding of the tarp between the roll tube and the latch plate further creates an unwanted strain on the crank handle so as to cause a spring-loaded effect which makes the handling of the crank handle somewhat hazardous when releasing the crank handle from the retainers at the back of the truck.

U.S. Pat. No. 4,212,492 discloses a roll-up cover apparatus which is retained in a covered position by straps which must be individually attached to the side of the vehicle and tightened. In addition to other problems, tightening of the individual straps is time consuming and often does not result in a uniformly tight cover apparatus.

The present invention solves these and many other problems associated with the art.

SUMMARY OF THE INVENTION

The roll-up tarp apparatus of the present invention includes a tarp made from a flexible material. The tarp has a length approximate to that of the truck box and a width greater than that of the truck box. The tarp is fixedly secured along one side edge to the top edge of one side of the truck box. A tubular member is attached to a second side edge of the tarp by a plurality of elongated, flexible straps. A plurality of hooks positioned along the side of the truck box opposite from the side where the tarp is fixedly secured, are utilized to retain the tubular member when the tarp is in a covered position. A crank apparatus is suitably attached to one end of the tubular member for rolling the tubular member across the truck box. As the tubular member is rolled, the tarp either rolls up on the tubular member so as to uncover the truck box, or unrolls from the tubular member so as to cover the truck box.

An advantage of one embodiment of the present invention is that the covering and uncovering of an open truck box may be readily accomplished by one individual. Furthermore, the straps retaining the tarp in the covered position are simultaneously tightened and loosened by a strap tightener/loosener apparatus which in operated from one location.

An advantage of yet another embodiment of the present invention is that the tubular member is attached to the tarp by a plurality of web straps such that the tubular member is not directly attached to the tarp but displaced therefrom. The outer surface of the tubular member slides on the hooks utilized to retain the tarp a covered position, with little resistance. This results in a tightening method which assures maximum tightness as there is minimum friction or resistance to overcome and which results in minimum tarp wear as the tarp does not engage the hooks or the tubular member.

A further advantage of an embodiment of the present invention is that accidental release, even when heaping of a load occurs, is minimized. The legs of the generally U-shaped hooks extend downward and are of a sufficient length such that should the tarp loosen due to settling of the heaped load, the tubular member will still be retained by the legs of the hooks.

Furthermore, there is little or no strain imparted on the crank handle due to the tarp binding, thus doing away with any spring loaded effect on the handle. Consequently, releasing the crank handle from the retainers at the back of the truck is a less hazardous operation.

Another advantage of one embodiment of the present invention is the presence of a strap tightening and loosening apparatus which is capable of tightening a plurality of straps for retaining the tarp in a taut, covered position. An enlongated roll bar which is attached to the straps along one side edge of the tarp cooperates with brackets positioned along the side of the vehicle, such that by rolling the roll bar in one direction, the straps are tightened, and by rolling the roll bar in an opposite direction, the straps are loosened.

Additionally, in one embodiment of the invention, the roll bar functions both as an apparatus for rolling or unrolling the tarp and as a wrench-like apparatus for simultaneously tightening or loosening a plurality of straps attached to the edge of the tarp.

In yet another embodiment of the present invention, a U-joint and locking collar assembly is utilized which allows quick attachment of a crank handle to the tubular member. Furthermore, in one embodiment, a spline shaft is utilized which enables adjustment of the crank handle such that the tarp is sufficiently extended or tightened when the handle is in a stored position.

These and various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 2 is a partial perspective view of the longitudinal edge of the tarp of the preferred embodiment which is fixedly secured to the truck box;

FIG. 4 is a side elevational view of the hook apparatus of the preferred embodiment of the present invention illustrating the roll tube being unrolled from or rolled onto the strap-like members;

FIG. 5 is a similar view showing the roll tube suspended from the end of the strap-like members;

FIG. 6 is a similar view illustrating the roll tube being retained by the hook apparatus and illustrating the hook apparatus offset from the side of the truck box;

FIG. 7 is a partial perspective view of the U-joint assembly of the preferred embodiment of the present invention; and FIG. 8 is a partial perspective view of the stretch cord attachment of the preferred embodiment of the present invention.

DETAILED DESCRIPTION OF THE PREFERRED EMBODIMENT

Figure 1:
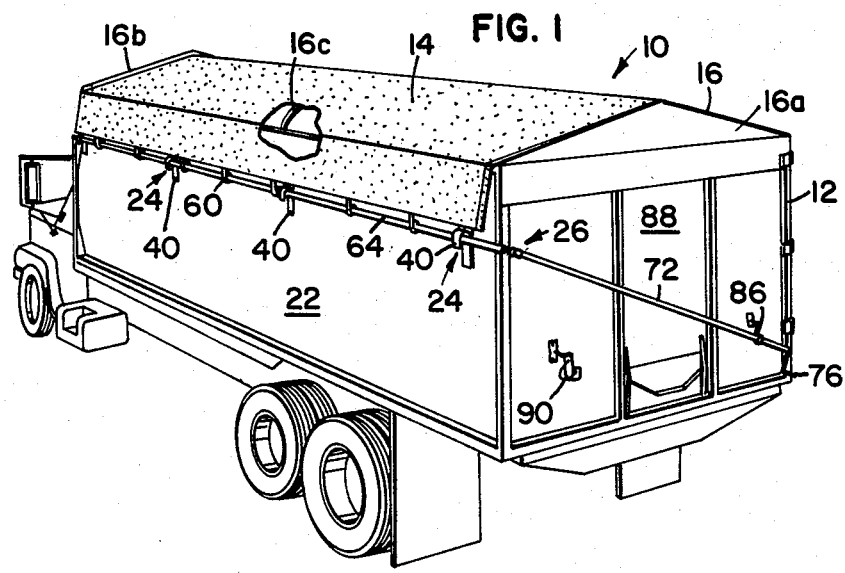
FIG. 1 is a view in perspective with portions removed of a truck box utilizing the preferred embodiment of the present invention.
Figure 3:
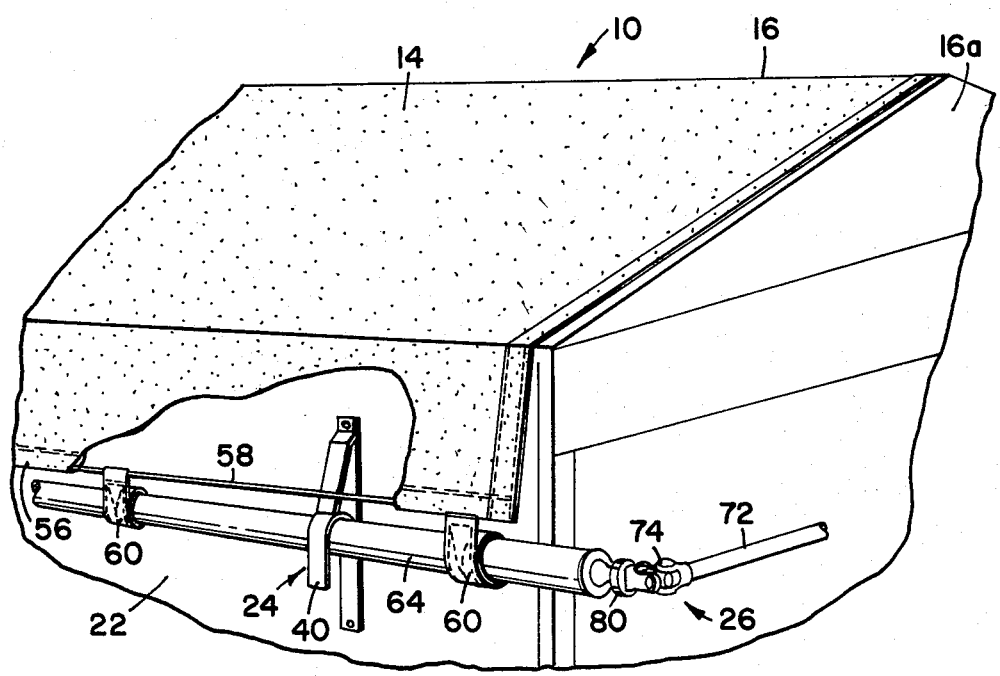
FIG. 3 is a partial perspective view with portions removed showing the hold down apparatus of the preferred embodiment of the present invention.

With reference now to the drawings, there is illustrated in FIG. 1 the preferred embodiment of the roll-up tarp apparatus of the present invention, the roll-up tarp apparatus being generally designated by the reference numeral 10. It will be appreciated, that while the roll-up tarp apparatus 10 is shown utilized with an open truck box or trailer 12, the present invention has application to other large containers having an open top requiring an easily and readily removable covering. The roll-up tarp apparatus 10 includes a flexible cover or tarp 14 which is stretched over and supported by a framework 16 suitably attached to the top of the truck box 12. As illustrated in FIG. 2, the tarp 14 is fixedly secured to the top edge of a longitudinal side 18 of the truck box 12 by a hold down apparatus generally designated by the reference numeral 20. The other longitudinal edge of the tarp 14 is releasably secured to a side 22 of the truck box 12 by a hold-down apparatus generally designated by the reference numeral 24 as illustrated in FIG. 3. The roll-up tarp apparatus 10 further includes a crank apparatus 26 for rolling and unrolling the tarp 14.

More particularly, as illustrated in FIGS. 1 through 3, the framework 16 includes front, back and intermediate members 16a,b,c which extend from the side 18 to the side 22 of the truck box 12. The framework members have a generally triangular shape to insure that the tarp 14 is supported above the load. The front and back members 16a,b are solid so as to cooperate with the tarp 14, and completely enclose the truck box 12. The framework 16 is preferably made from a material sufficiently rigid to support the tarp 14, and yet sufficiently light to as to not add appreciable weight to the load. It will be appreciated, that other suitable framework may be utilized in keeping with the principles of the present invention.

As illustrated in FIG. 2, the tarp 14 is fixedly secured along a longitudinal edge thereof to the top of the side 18 by the hold-down apparatus 20. In the preferred embodiment illustrated, the hold-down apparatus 20 includes a hollow tube 28 positioned in a hem portion along the edge of the tarp 14. Stops 30 having an arcuately shaped end portion 32 and a vertically extending upright portion 34 are suitably secured to the top of the side wall 18 by screws 36 or the like. The arcuate portion engages the tube 28 along the edge of the tarp 14 while the vertically upright portion 34 retains the tarp apparatus 10 on top of the truck box 12 when in an uncovered or stored position. Additional fasteners 38, not having an upright portion, may be positioned at spaced intervals along the edge of the tarp 14 to assist in securing the tarp 14 to the truck box 12. It will be appreciated that other suitable apparatus for securing the tarp 14 along its longitudinal edge to the truck box 12 may be utilized in keeping with the principles of the present invention.

The releasable hold-down apparatus 24 as illustrated in FIGS. 1 and 3 includes a plurality of hooks 40 attached at spaced intervals to the side 22 opposite the side 18 of the truck box 12. As illustrated in FIGS. 4 through 6, the hooks 40 include a generally U-shaped portion 42 including leg portions 44,46 and an arcuate portion 48. The hooks 40 further include integral with the U-shaped portion 42 a brace portion 50 including leg portions 52,54. The hooks 40 are suitably secured to the truck box side wall 22 below the top edge thereof by screws or the like.

As illustrated in FIG. 3, the longitudinal edge of the tarp 14 adjacent the hooks 40 includes a hem portion 56 defining a sleeve or aperture for receipt of a rod member 58. In the preferred embodiment, the rod member 58 is a one-half inch diameter, solid fiberglass rod. At predetermined spaced locations along the edge of the tarp 14, rectangular apertures are present to enable flexible web straps 60 to be attached to the rod member 58. As illustrated in FIGS. 3 through 6, the straps 60 include a hem portion 62 at the end thereof adapted for receipt of the rod member 58. Preferably the rod member 58 has sufficient structural integrity such that it will withstand the forces exerted thereon by the straps 60 when the tarp 14 is tightened by the crank apparatus 26.

The straps 60 are attached at their other end to a hollow tubular roll-bar 64 by a hem portion 66 adapted for receipt of the roll-bar 64. The straps 60 are fixedly secured to the roll-bar 64 in a suitable fashion, e.g. a rivet and washer combination (not shown), such that the roll-bar 64 will not slip in the hem of the straps 60. The straps 60 are of such a length that when fully extended the roll bar 64 is positioned below the bottom of the leg portion 44 as illustrated in FIG. 5. Additionally, the tarp 14 is of such a width that when fully stretched across the truck box opening, the rod 58 rests generally against leg portion 52 of the hooks 40 as illustrated generally in FIGS. 4 through 6. Thus, when the tarp 14 is fully unrolled so as to cover the truck box 12, the rod member 58 will be held outwardly from the side of the truck box 12. As a result, the roll bar 64 will similarly be displaced outwardly from the side of the truck box as illustrated in FIG. 5 such that the roll bar 64 may either be rolled up into the U-shaped portion 42 of the hooks 40 as illustrated in FIG. 6 or rolled up back over the hooks 40 as illustrated in FIG. 4. The leg portions 52 thus function both as a support for the hooks 40 and as a structure for displacing the rod 58 and the roll bar 64 away from the side of the truck box 12. The leg portions 52, by retaining the rod member 58 away from the side of the truck box 12, assist in positioning the roll bar 64 in all the hooks 40 when tightening the straps 60 and further assist in releasing the roll bar 64 from the hooks 40 when the sraps 60 are loosened and the tarp 14 is rolled up to its stored position. The leg portions 52, in addition to other functions, thus serve to generally align the roll bar 64 with the leg portions 42 of the hooks 40 such that the roll bar 64 is readily positioned in the hooks 40 for tightening the sraps 60 and readily released from the hooks 40 thereby releasing the straps 60 such that the tarp 14 may be rolled up. As illustrated in FIG. 6, in certain applications spacer members 59 may be utilized to position the hooks 40 away from the side 22 of the vehicle 12.

The roll bar 64 in the embodiment illustrated, thus assists in attaching/releasing the straps 60 to/from the hooks 40 and tightening/loosening the straps 60. This readily enables one person to attach/release a plurality of straps and tighten or loosen the same by operating one end of the roll bar 64.

As illustrated in FIG. 3, the roll bar 64 extends generally parallel to the edge of the tarp 14. Preferably, the roll bar 64 has a hollow tubular configuration. When the tarp 14 is in a covered position, the roll bar 64 is retained in place by the hooks 40. Preferably, the hooks 40 and the roll bar 64 are both made from a metal such that there is minimal friction between the hooks 40 and the roll bar 64 and therefore little resistance to the tarp 14 being tightened by rolling the roll bar 64 up into and against the arcuate portion 48 of the hooks 40. Furthermore, the roll bar 64 is displaced from the tarp 14, such that the tarp 14 does not engage the hooks 40. Consequently, there is no fabric wear of the tarp 14 as would be the case if the tarp 14 was wrapped around the roll bar 64.

While in the preferred embodiment shown, the web straps 60 are made from nylon, it will be appreciated that the web straps 60 might be made from other materials and in particular an elastic material. Elastic web straps 60 would further assist in retaining the roll bar 64 in the hooks 40 if the load should settle.

As further illustrated in FIGS. 3 and 7, the crank apparatus 26 for rolling and unrolling the tarp 14 is positioned at the back end of the truck box 12. The roll bar 64 has suitably attached to its back end, which extends a predetermined distance beyond the end of the truck box 12, a spline shaft 70 as illustrated in FIG. 7. In the preferred embodiment shown, the spline shaft has fifteen (15) separate splines. The crank apparatus 26 includes an elongated tubular member 72 having a U-joint assembly 74 attached to one end and a handle 76 attached to the other end as illustrated in FIG. 1.

In the embodiment shown, the U-joint assembly 74 locks at quarter turns. Suitably connected to the U-joint assembly 74, is a locking collar assembly 80 which is utilized to retain the crank apparatus 26 on the spline shaft 70. The locking collar assembly 80 includes bearings (not shown) which are pushed radially inward upon pushing forward on the locking collar assembly 80 as generally indicated by arrow 82. The bearings are displaced into the groove 84 defined in the spline shaft 70 so as to retain the crank apparatus 26 on the spline shaft 70. To release the crank apparatus 26, the locking collar assembly is pulled backward in a direction opposite to that indicated by arrow 82. The bearings are then released and spring radially outward such that the crank apparatus 26 can be removed from the spline shaft 70. It will be appreciated that the U-joint assembly 74 and the spline shaft 70 provides for much flexibility in adjusting the orientation of the U-joint assembly 74 with respect to the roll bar 64. This enables the crank apparatus 26 to be readily attached to the roll bar 64 such that the tarp 14 is sufficiently taught when the crank apparatus 26 is placed in its stored position at the back of the truck box 12 as illustrated in FIG. 1. When stored, the tubular member 72 is retained by a bracket 86 on a back side 88 of the truck box. When the tarp 14 is rolled up and stored along its secured edge such that the truck box is open, the elongated tubular member will be retained by a bracket 90, similar to the bracket 86. It will be appreciated, that the roll bar 64 must extend beyond the back of the truck box 12 to enable clearence for the crank apparatus 26. Other suitable retainer brackets may be utilized in keeping within the principles of the present invention.

As illustrated in FIG. 8, the front end of the roll bar 64 is connected to a stretch cord 92 which is suitably fastened to the side 22 of the truck box 12 by a bracket 94. The stretch cord 92, as illustrated in FIG. 8, will be inserted into the end of the hollow roll bar 64 and extend a predetermined distance through the roll bar to an aperture in the roll bar 64 (not shown) where the stretch cord 92 will be secured in the roll bar 64. In the preferred embodiment, the stretch cord 92 extends approximately twelve (12) feet through the roll bar 64. The stretch cord 92 is made from a resilient material and assist in rolling and unrolling the roll-up tarp apparatus 10 of the present invention. The stretch cord 92, by maintaining tension on the end of the roll bar 64, assists in keeping the tarp 14 aligned during the rolling process and assists in helping the roll bar 64 clear the top of the framework 16 during the rolling and unrolling process. The stretch cord 92 also serves to function as a shock absorber to a certain extent.

The present invention may be installed on the truck box by the user due to its relative ease of installation and assembly. The user, when installing the roll-up tarp apparatus 10, first positions and suitably attached the framework 16 on the top of the truck box 12. The tube 28 and rod member 58 are inserted along the side edges of the tarp 14. When installing the rod member 58, the web straps 60 are positioned thereon and the roll bar 64 is inserted through the other end of the straps 60. The tarp 14 is then fixedly secured to the top of the truck box 12 along the side 18 by the use of the stops 30 and fasteners 38. Next, the crank apparatus 26 may be assembled. The tubular member 72 is fixedly secured to the handle 76 by spot welding or the like and the U-joint assembly 74 secured to the other end of the tubular member 72 by screws or the like. If not previously attached, the spline shaft 70 is fixedly secured to the end of the roll bar 64. The crank apparatus 26 is then readily attached to the spline shaft 70 by pushing forward on the locking collar assembly 80 as generally indicated by the arrow 82. (The U-joint assembly 74 with locking collar assembly 80 is a commercially available item and may be obtained from Weasler Engineering, Inc., Box 558, West Bend, Wis. 53095.) The locking collar assembly 80 provides for the quick and easy connection of the crank apparatus 26 to the roll bar 64. It will further be appreciated, that the multiple splined spline shaft 70 and the U-joint assembly 74 allows the orientation of the crank apparatus 26 to be adjusted as required for attachment in the brackets 86,90 on the back end 88 of the truck box 12. Next, the hold down hooks 40 are attached to the side 22 of the truck box 12. This may be accomplished by hanging the hold down hooks 40 on the roll bar 64 at locations between the web straps 60. The roll bar 64 is then rolled counterclockwise until the rod member 58 is positioned along leg portions 52 of the hooks 40. The hooks 40 are then attached at this location to the side of the truck box 12. Once the hooks 40 are attached, the tarp 14 is unrolled and stretched tight with the roll bar 64 positioned under the hooks 40. The handle bracket 86 can then be properly positioned on the back of the truck box. The tarp 14 can then be rolled up into the uncovered or stored position and the crank apparatus properly positioned such that the bracket 90 can be attached to the back of the truck box 12. The stretch cord 92 may then be attached to the side of the truck box.

In use, the tarp 14 may be rolled up and stored along the longitudinal top edge of the truck box 12 when not being used or when necessary to enable access to the truck box 12. To cover the truck box 12, the user may simply grasp the handle 76 at the end of the tubular member 72 and roll the roll bar 64 in a counterclockwise direction by turning the handle 76 such that the tarp 14 is unrolled. The operator, during the covering process, continues to rotate the roll bar 64 in a counterclockwise direction such that the roll bar 64 passes the hooks 40 and continues rolling the roll bar 64 in a counterclockwise direction until the roll bar 64 engages the arcuate portion 48 of the hooks and the tarp 14 is sufficiently tightened. The crank apparatus 26 may then be stored for transit at the back end of the truck box as illustrated in FIG. 1.

It will be appreciated that the present invention provides a roll-up tarp apparatus which does not subject the tarp 14 to extensive wear along its free edge. This is due to the fact that the roll bar 64 is not directly attached to the tarp 14, but rather by a plurality of web straps 60. Furthermore, the exposed outer surfaces of the roll tube 64 preferably has a metal surface or such a surface which will rotatably slide on the arcuate portions 48 of the hooks 40, which also are preferably made from metal or other suitable material, with little resistance or minimum friction. Consequently, there is little opposing force exerted on the crank apparatus 26 as the operator stretches the tarp 14 tight. As a result, a very tightly stretched tarp 14 is obtainable. Furthermore, the leg portions 44 of the hooks 40 extend a substantial distance downward beyond the roll bar 64 so that if the tarp 14 is utilized to cover a load which is heaped above the framework 16, the hooks 40 will not release the roll bar 64 even if the load should settle and the tarp 14 slightly loosen. Further, if the straps 60 are resilient, they will assist in keeping tension on the tarp 14.

Additionally, the present invention does not place an unwanted strain upon the crank apparatus 26 which results when there are forces which oppose the tightening of the tarp 14. This is especially true in those systems wherein the tarp is directly connected to the roll bar so as to bind and bunch up between the roll bar and a latch plate. In the present invention, there is very little resistance so as to minimize any spring effect.

Furthermore, the locking assembly collar 80 provides quick attachment of the crank apparatus 26 to the roll bar 64 without necessitating any extra locking pins or the like.

Furthermore, the roll-bar 64 in one embodiment of the present invention functions as a strap tightener/loosener apparatus and as an apparatus for rolling and unrolling the tarp 14. When functioning as a strap tightener/loosener, the roll bar 64 does not engage the tarp 14 and enables generally simultaneous, uniform tightening of the straps 60.

It is to be understood, however, that even though the above numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention, to the full extent indicated by the broad general meaning of the terms in which the appended claims are expressed.

What is claimed is:

1. A roll-up tarp apparatus for an open truck box or the like comprising:
    (a) a tarp made of a flexible material, said tarp having a length approximate that of the length of the truck box, said tarp further having a width somewhat greater than the width of the truck box;
    (b) means for fixedly securing a first side edge of said tarp to a first longitudinal side of the truck box;
    (c) an elongated roll-bar member attached to a second side edge of said tarp by a plurality of elongated, flexible strap members, said elongated roll-bar member being displaced from said second side edge of said tarp;
    (d) crank means interconnected to said elongated roll-bar member for rolling said elongated roll-bar member transversely of the open truck box so as to cover the truck box with said tarp or uncover the truck box, said crank means including an elongated crank handle interconnected to said elongated roll-bar member and further including retaining bracket means positioned proximate an end of the truck box for retaining the crank handle when said tarp is in a covered position; and
    (e) a plurality of spaced hook members displaced downwardly from the top edge of a second longitudinal side of the truck box and adapted for receipt of said elongated roll-bar member, said hook members cooperating with said crank means for retaining said elongated roll-bar member when said tarp is in a covered position.

2. A roll-up tarp apparatus in accordance with claim 1, wherein said hook-like members include a generally U-shaped portion.

3. A roll-up tarp apparatus in accordance with claim 2, wherein said hook-like members further include a portion for displacing said second side edge of said tarp away from the side of the truck box.

4. A roll-up tarp apparatus in accordance with claim 1, wherein said second side edge of said tarp includes a hem portion including a rod member positioned therein, said flexible strap members being attached at a first end to said rod member and at a second end to said elongated roll-bar member, said elongated member being spaced from said tarp.

5. A roll-up tarp apparatus in accordance with claim 1, wherein said elongated roll-bar member is hollow, a first end of said elongated member being connected to the truck box by a resilient cord, said resilient cord being inserted a predetermined distance into said elongated member.

6. A roll-up tarp apparatus in accordance with claim 1, wherein said crank means includes a U-joint and locking collar assembly mounted on the end of the crank handle, said locking collar assembly being constructed and arranged so as to retain said U-joint assembly on a spline shaft positioned at a second end of said elongated roll-bar member.

7. A roll-up cover assembly for an open container or the like, comprising:
   (a) a flexible cover, said cover being secured at a first side edge to a first side of the container, said flexible cover being overlapped on itself along a second side edge opposite said first edge to form a sleeve adapted for receipt of an elongated rod;
   (b) a tubular member attached to said rod by a plurality of flexible, elongated straps, said tubular member being displaced from the edge of said tarp;
   (c) a plurality of hooks attached to a second side of said container for receiving said tubular member when said container is enclosed by said cover; and
   (d) crank means interconnected to said tubular member for rolling said tubular member in a first direction to enclose said container and in a second direction to uncover said container, said crank means cooperating with said hooks for retaining said tubular member when said container is enclosed by said cover.

8. A roll-up cover assembly in accordance with claim 7, wherein said crank means includes a U-joint assembly connected to the end of a crank handle, said U-joint assembly being operatively connected to a first end of said tubular member, said crank means further including retaining bracket means proximate an end of the container for retaining the crank handle when said container is enclosed by said cover.

9. A roll-up cover assembly in accordance with claim 8, wherein said first end of said tubular member includes a spline shaft member, said U-joint assembly further including a locking collar adapted for releasably locking said U-joint assembly onto said spline shaft.

10. A roll-up cover assembly in accordance with claim 9, wherein a second end of said tubular member is attached to a resilient cord, said resilient cord being further attached to the container.

11. A roll-up tarp apparatus for an open truck box or the like, comprising:
   (a) a tarp made from a flexible material;
   (b) a framework positioned between first and second sides of the truck box for supporting the tarp;
   (c) means for securing a first edge of said tarp to the first side of said truck box;
   (d) securing means for releasably securing said tarp to the second side of the said truck box;
   (e) an elongated tubular member being attached to a second edge of the tarp by a plurality of straps so as to be displaced from the second edge of the tarp, said elongated tubular member cooperating with said securing means for releasably securing said tarp; and
   (f) crank means operatively connected to said tubular member for rolling or unrolling said tarp over said framework, said crank means including an elongated handle connected to a U-joint assembly at one end thereof, said U-joint assembly including a collar assembly for releasably locking said U-joint assembly onto a spline shaft attached to an end of said tubular member.

12. A roll-up cover assembly for an open container or the like, comprising:
   (a) a flexible cover, said cover being secured at a first side edge to a first side of the container;
   (b) a plurality of straps attached at a first end to a second side edge of said flexible cover, said straps being interconnected at a second end to an elongated roll-bar member displaced from the second side edge of said flexible cover;
   (c) crank means interconnected to said elongated roll-bar member for rolling said elongated roll-bar member in a first direction to enclose said container and in a second direction to uncover said container; and
   (d) hook means positioned on a second side of the container for receiving said elongated roll-bar member, said hook means cooperating with said elongated roll-bar member when said elongated roll-bar member is rolled upward into said hook means by said crank means to tighten the straps such that the tarp is drawn taut.

13. A roll-up cover assembly in accordance with claim 12, further including means for vertically aligning said elongated roll-bar member with a plurality of hook members positioned on the side of the container such that said tubular member member may be readily and simultaneously positioned in said hook members or removed therefrom.

14. A roll-up cover assembly in accordance with claim 13, wherein said means for vertically aligning said elongated roll-bar member includes a structure attached to the side of the container for displacing the elongated roll-bar member away from the side of the container.

* * * * *

UNITED STATES PATENT AND TRADEMARK OFFICE
CERTIFICATE OF CORRECTION

PATENT NO. : 4,505,512
DATED : March 19, 1985
INVENTOR(S) : Steven C. Schmeichel et al.

It is certified that error appears in the above—identified patent and that said Letters Patent is hereby corrected as shown below:

Column 2, line 12, "in" should be --is--;

Column 2, line 42, "enlongated" should be --elongated--;

Column 3, line 66, "to" (second occurence) should be --so--;

Column 5, lines 5 and 13, "sraps" should be --straps--;

Column 6, line 9, "taught" should be --taut--;

Column 6, line 33, "assist" should be --assists--.

Signed and Sealed this

Seventeenth Day of June 1986

[SEAL]

Attest:

DONALD J. QUIGG

Attesting Officer

Commissioner of Patents and Trademarks